United States Patent
Lu et al.

(10) Patent No.: US 10,149,214 B2
(45) Date of Patent: Dec. 4, 2018

(54) SECONDARY CELL SELECTION BASED ON GEOGRAPHIC SIGNATURES

(71) Applicant: Telefonaktiebolaget L M Ericsson (publ), Stockholm (SE)

(72) Inventors: Guoqiang Lu, Ottawa (CA); Karl D. Mann, Ottawa (CA); Lisa Boström, Solna (SE); Eric W. Parsons, Stittsville (CA); Richard Liu, Ottawa (CA); Iris Bujold, Ottawa (CA); Jamie Beuerman, Kanata (CA); Qingchao Liu, Ottawa (CA); Damitha Ranaweera, Kanata (CA); Edward Mah, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/171,338

(22) Filed: Feb. 3, 2014

(65) Prior Publication Data
US 2015/0223125 A1    Aug. 6, 2015

(51) Int. Cl.
*H04W 36/04* (2009.01)
*G01S 5/00* (2006.01)
(Continued)

(52) U.S. Cl.
CPC ............. *H04W 36/04* (2013.01); *G01S 5/00* (2013.01); *H04L 5/00* (2013.01); *H04L 5/0069* (2013.01);
(Continued)

(58) Field of Classification Search
CPC ..... H04W 36/04; H04W 24/02; H04W 48/20; H04L 5/00
(Continued)

(56) References Cited

U.S. PATENT DOCUMENTS

| 8,509,810 B2 | 8/2013 | Sanders et al. |
| 9,055,565 B2 | 6/2015 | Kim et al. |

(Continued)

FOREIGN PATENT DOCUMENTS

| EP | 2326122 A1 | 5/2011 |
| EP | 2775758 A1 | 2/2012 |

(Continued)

OTHER PUBLICATIONS

Author Unknown, "3rd Generation Partnership Project; Technical Specification Group Radio Access Network; Evolved Universal Terrestrial Radio Access (E-UTRA); Physical channels and modulation (Release 10)," Technical Specification 36.211, Version 10.7.0, Feb. 2013, 3GPP Organizational Partners, 101 pages.

(Continued)

*Primary Examiner* — Kathy W Wang-Hurst
*Assistant Examiner* — Said M Elnoubi
(74) *Attorney, Agent, or Firm* — Patent Portfolio Builders, PLLC

(57) ABSTRACT

Systems and methods for Secondary Cell (sCell) selection for wireless devices operating according to a carrier aggregation scheme in a cellular communications network are disclosed. In one embodiment, a network node in the cellular communications network obtains geographic signatures for a number of candidate sCells. The geographic signatures include a geographic signature for each candidate sCell that approximates a coverage area of the candidate sCell. The network node obtains position information for a wireless device and then selects one or more sCells for the wireless device from the candidate sCells based on the geographic signatures for the candidate sCells and the position information for the wireless device. The network node then configures the selected sCell(s) for use by the wireless device according to a carrier aggregation scheme. Using this (Continued)

process, sCell selection is performed, in some examples, without measurement gaps and without disabling an s-Measure parameter.

31 Claims, 12 Drawing Sheets

(51) Int. Cl.
  *H04L 5/00* (2006.01)
  *H04W 48/20* (2009.01)
  *H04W 36/06* (2009.01)
  *H04W 36/32* (2009.01)
(52) U.S. Cl.
  CPC ............ *H04W 48/20* (2013.01); *H04L 5/001* (2013.01); *H04W 36/06* (2013.01); *H04W 36/32* (2013.01)
(58) Field of Classification Search
  USPC .................................. 455/456.1–456.6, 437
  See application file for complete search history.

(56) References Cited

U.S. PATENT DOCUMENTS

| | | | |
|---|---|---|---|
| 2004/0067759 A1* | 4/2004 | Spirito .................. | H04W 64/00 455/456.1 |
| 2004/0116110 A1 | 6/2004 | Amerga et al. | |
| 2004/0121770 A1 | 6/2004 | Tigerstedt et al. | |
| 2004/0121773 A1 | 6/2004 | O'Brien | |
| 2004/0152471 A1* | 8/2004 | MacDonald .......... | G01S 5/0252 455/456.1 |
| 2006/0067275 A1* | 3/2006 | Yang ..................... | H04W 16/18 370/332 |
| 2007/0225045 A1* | 9/2007 | Jordan .................. | H04W 16/28 455/562.1 |
| 2009/0279494 A1* | 11/2009 | Halbauer .............. | H04L 5/0007 370/329 |
| 2010/0036161 A1 | 2/2010 | Bontempelli et al. | |
| 2010/0093356 A1* | 4/2010 | Lee ......................... | H04W 4/20 455/437 |
| 2010/0167744 A1 | 7/2010 | Grob-Lipski et al. | |
| 2010/0240356 A1* | 9/2010 | Lee ........................ | H04W 36/32 455/422.1 |
| 2011/0044285 A1 | 2/2011 | Jang et al. | |
| 2011/0117917 A1 | 5/2011 | Gresset et al. | |
| 2011/0299446 A1* | 12/2011 | Chun .................... | H04W 36/04 370/311 |
| 2012/0004010 A1 | 1/2012 | Tamura et al. | |
| 2012/0142361 A1 | 6/2012 | Zhao et al. | |
| 2012/0250578 A1 | 10/2012 | Pani et al. | |
| 2012/0276945 A1* | 11/2012 | Chindapol ............ | H04W 48/20 455/525 |
| 2012/0327878 A1 | 12/2012 | Pedersen et al. | |
| 2013/0022016 A1 | 1/2013 | Wei | |
| 2013/0115943 A1* | 5/2013 | Bao ....................... | H04W 48/16 455/434 |
| 2013/0130695 A1 | 5/2013 | Ryu et al. | |
| 2013/0194947 A1 | 8/2013 | Ehsan et al. | |
| 2013/0229307 A1* | 9/2013 | Chang ................... | H01Q 1/246 342/372 |
| 2014/0011513 A1* | 1/2014 | Watts .................... | G01S 5/0252 455/452.2 |
| 2014/0140293 A1* | 5/2014 | Sharma ................. | H04L 5/001 370/329 |
| 2014/0187246 A1* | 7/2014 | Jha ........................ | H04W 48/08 455/436 |
| 2014/0213263 A1* | 7/2014 | Ryan ..................... | H04W 48/16 455/437 |
| 2014/0307623 A1 | 10/2014 | Gheorghiu et al. | |
| 2015/0087315 A1 | 3/2015 | Lu et al. | |
| 2015/0087316 A1 | 3/2015 | Boström et al. | |
| 2015/0156773 A1 | 6/2015 | Yao et al. | |
| 2015/0172949 A1 | 6/2015 | Lee et al. | |

FOREIGN PATENT DOCUMENTS

| | | |
|---|---|---|
| EP | 2525597 A1 | 11/2012 |
| WO | 2010036161 A1 | 4/2010 |
| WO | 2013028128 A1 | 2/2013 |
| WO | 2013063885 A1 | 5/2013 |

OTHER PUBLICATIONS

Author Unknown, "3rd Generation Partnership Project; Technical Specification Group Radio Access Network; Evolved Universal Terrestrial Radio Access (E-UTRA); Physical layer procedures (Release 8)," Technical Specification 36.213, Version 8.8.0, Sep. 2009, 3GPP Organizational Partners, 77 pages.

Author Unknown, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," Technical Specification 36.300, Version 10.11.0, Sep. 2013, 3GPP Organizational Partners, 195 pages.

Author Unknown, "3rd Generation Partnership Project; Technical Specification Group Radio Access Network; Evolved Universal Terrestrial Radio Access (E-UTRA); Radio Resource Control (RCC); Protocol specification (Release 10)," Technical Specification 36.331, Version 10.11.0, Sep. 2013, 3GPP Organizational Partners, 308 pages.

Author Unknown, "3rd Generation Partnership Project; Technical Specification Group Radio Access Network; Evolved Universal Terrestrial Radio Access (E-UTRA); LTE Positioning Protocol (LLP) (Release 10)," Technical Specification 36.355, Version 10.11.0, Dec. 2013, 3GPP Organizational Partners, 118 pages.

Author Unknown, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," Technical Specification 36.300, Version 11.7.0, Sep. 19, 2013, 3GPP Organizational Partners, 209 pages.

Author Unknown, "3rd Generation Partnership Project; Technical Specification Group Radio Access Network; Evolved Universal Terrestrial Radio Access (E-UTRA); Radio Resource Control (RRC); Protocol specification (Release 11)," Technical Specification 36.311, Version 11.5.0, Sep. 16, 2013, 3GPP Organizational Partners, 347 pages.

International Search Report and Written Opinion for PCT/IB2014/064292 dated Dec. 23, 2014, 14 pages.

Nokia Siemens Networks et al., "R2-130124: User data rate enhancements with inter-site CA," 3rd Generation Partnership Project (3GPP), TSG-RAN WG2 Meeting #81, Jan. 28-Feb. 1, 2013, Malta, 4 pages.

NSN et al., "R2-132339: Autonomous SCell Management for Dual Connectivity Cases," 3rd Generation Partnership Project (3GPP), TSG-RAN WG2 Meeting #83, Aug. 19-23, 2013, Barcelona, Spain, 4 pages.

Qualcomm Incorporated, "R4-130402: SCell Reporting Issues," 3rd Generation Partnership Project (3GPP), TSG-RAN WG4 Meeting #66, Jan. 28-Feb. 1, 2013, St. Julian's, Malta, 2 pages.

Invitation to Pay Additional Fees and Partial International Search Report for PCT/IB2015/050739, dated Apr. 7, 2015, 9 pages.

Non-Final Office Action for U.S. Appl. No. 14/251,021, dated Nov. 3, 2015, 15 pages.

Final Office Action for U.S. Appl. No. 14/325,037, dated Jan. 14, 2016, 21 pages.

International Preliminary Report on Patentability for International Patent Application No. PCT/IB2014/064292, dated Dec. 4, 2015, 10 pages.

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Technical Specification 36.300, Version 12.2.0, 3GPP Organizational Partners, Jun. 2014, 215 pages.

(56) References Cited

OTHER PUBLICATIONS

Advisory Action and AFCP 2.0 Decision for U.S. Appl. No. 14/251,021, dated Jun. 15, 2016, 4 pages.
Non-Final Office Action for U.S. Appl. No. 14/251,021, dated Jul. 21, 2016, 17 pages.
Non-Final Office Action for U.S. Appl. No. 14/325,037, dated Aug. 22, 2016, 22 pages.
Written Opinion for International Patent Application No. PCT/IB2015/054699, dated Jun. 10, 2016, 9 pages.
Final Office Action for U.S. Appl. No. 14/251,021, dated Apr. 15, 2016, 16 pages.
Advisory Action for U.S. Appl. No. 14/325,037, dated Apr. 6, 2016, 5 pages.
Final Office Action for U.S. Appl. No. 14/251,021, dated Dec. 14, 2016, 20 pages.
Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.5.0, 3GPP Organizational Partners, Sep. 2013, 347 pages.
New Postcom, "R3-112498: Carrier Selection for Macro-Pico Scenario," 3rd Generation Partnership Project (3GPP), TSG RAN WG3 Meeting #73bis, Oct. 10-14, 2011, 3 pages, Zhuhai, China.
Pedersen, Klaus I. et al., "Mobility Enhancements for LTE-Advanced Multilayer Networks with Inter-Site Carrier Aggregation," IEEE Communications Magazine, vol. 51, Issue 5, May 2013, IEEE, pp. 64-71.
Shen, Zukang et al., "Overview of 3GPP LTE-Advanced Carrier Aggregation for 4G Wireless Communications," IEEE Communications Magazine, vol. 50, Issue 2, Feb. 2012, IEEE, pp. 122-130.
Non-Final Office Action for U.S. Appl. No. 14/325,037, dated Jul. 21, 2015, 18 pages.
Written Opinion for International Patent Application No. PCT/IB2014/064292, dated Aug. 27, 2015, 9 pages.
International Search Report and Written Opinion for International Patent Application No. PCT/IB2015/054699, dated Aug. 28, 2015, 16 pages.
International Search Report and Written Opinion for International Patent Application No. PCT/IB2015/050739, dated Sep. 2, 2015, 22 pages.

\* cited by examiner

SECONDARY CELL SELECTION BASED ON GEOGRAPHIC SIGNATURES

FIELD OF THE DISCLOSURE

The present disclosure relates to a cellular communications network and more particularly relates to secondary cell selection for wireless devices operating according to a carrier aggregation scheme.

BACKGROUND

Carrier aggregation was introduced in $3^{rd}$ Generation Partnership Project (3GPP) Long Term Evolution Advanced (LTE) Release 10 (LTE Rel-10) as a LTE-Advanced feature. Using carrier aggregation, multiple "Component Carriers" (CCs) can be aggregated and jointly used for transmission to or from a single wireless device. Each component carrier can have any of the LTE Release 8 (LTE Rel-8) bandwidths: 1.4, 3, 5, 10, or 20 Megahertz (MHz). Up to five component carriers can be aggregated to give a maximum aggregated bandwidth of 100 MHz. Further, each component carrier uses the LTE Rel-8 structure to provide backward compatibility (i.e., each component carrier appears as an LTE Rel-8 carrier).

FIG. 1 illustrates one example of carrier aggregation. In this example, cells 10-0 through 10-4 having carrier frequencies F0, F1, F2, F3 and F4 can be aggregated. In this example, the cells 10-0 through 10-4 are transmitted by a single base station 12. With respect to a particular wireless device, one of the cells 10-0 through 10-4 serves as a Primary Cell (pCell) of the wireless device, where the pCell handles Radio Resource Control (RRC) connection. The component carrier of the pCell is referred to as the Primary Component Carrier (PCC). Other cells aggregated with the pCell for the wireless device are referred to as Secondary Cells (sCells) having corresponding Secondary Component Carriers (SCCs). All of the aggregated cells for the wireless device are referred to as serving cells of the wireless device.

The coverage areas of the cells 10-0 through 10-4 may differ either due to different component carrier frequencies or due to power planning on the different component carriers. In the example of FIG. 1, the cell 10-0 has the largest coverage area and serves as the pCell for wireless devices A, B, C, D, and F located in the cell 10-0. The cells 10-1 through 10-4 have successively smaller coverage areas and serve as sCells for wireless devices B through F. In this example, wireless device A has no sCell coverage, wireless device B has sCell coverage for one sCell (namely cell 10-1), wireless device C has sCell coverage for two sCells (namely cells 10-1 and 10-2), wireless device D has sCell coverage for three sCells (namely cells 10-1, 10-2, and 10-3), and wireless device F has sCell coverage for four sCells (namely cells 10-1, 10-2, 10-3, and 10-4). Therefore, depending on the position of a wireless device within the pCell, the wireless device may have no sCell coverage or have coverage of one or more sCells.

For a wireless device connected to the pCell on carrier frequency F0 (e.g., wireless device A), the base station 12 normally starts inter-frequency layer 3 (L3) measurements on candidate sCell(s) in order to determine whether the wireless device has any sCell coverage. For instance, the base station 12 normally starts inter-frequency L3 measurements such as, for example, a measurement that triggers an A4 event when the inter-frequency L3 measurement for an sCell becomes better than a threshold. In the LTE specifications, an A4 event occurs when a neighbor cell becomes better than a threshold, which is referred to herein as an A4 threshold. In the example of FIG. 1, with a proper A4 threshold, an A4 event will trigger on carrier frequency F1 for wireless device B to thereby indicate that wireless device B has sCell coverage via the cell 10-1. In contrast, for wireless device F, an A4 event will trigger on carrier frequencies F1, F2, F3, and F4 to thereby indicate that wireless device F has sCell coverage via cells 10-1, 10-2, 10-3, and 10-4. Based on the measurement event triggering, one or more sCells are selected and configured for each wireless device having sCell coverage.

One issue with this normal sCell selection process is that the inter-frequency measurements may require measurement gaps. Measurement gaps are periods during which there is no traffic in both the uplink and downlink directions. Using measurement gaps to perform the inter-frequency measurements for sCell selection will incur 7-15% throughput loss on configured cells depending on the gap pattern configured.

Another issue with the normal sCell selection process is that to perform any measurements (inter-frequency or intra-frequency, gap or gapless measurements) on the candidate sCells, the parameter s-Measure may have to be disabled. As defined in the LTE specifications, when the pCell's Reference Signal Received Power (RSRP) measurement is not below s-Measure, the wireless device is not required to perform any neighbor cell measurements including the measurements on the candidate sCell(s) to save battery. Thus, as illustrated in FIG. 2, the wireless devices A, B, C, D, and F may not perform neighbor cell measurements unless they are outside the indicated s-Measure line, which corresponds to the s-Measure parameter. Thus, in order to guarantee that the measurements on the candidate sCell(s) are being performed by the wireless devices A, B, C, D, and F when using the normal sCell selection process, the s-Measure parameter will have to be disabled which will cause increased wireless device battery consumption.

In light of the discussion above, there is a need for systems and methods for improved sCell selection.

SUMMARY

Systems and methods for Secondary Cell (sCell) selection for wireless devices operating according to a carrier aggregation scheme in a cellular communications network are disclosed. In one embodiment, a network node in the cellular communications network obtains geographic signatures for a number of candidate sCells. The geographic signatures include a geographic signature for each candidate sCell that approximates a coverage area of the candidate sCell. The network node obtains position information for a wireless device and then selects one or more sCells for the wireless device from the candidate sCells based on the geographic signatures for the candidate sCells and the position information for the wireless device. The network node then configures the selected sCell(s) for use by the wireless device according to a carrier aggregation scheme.

In one embodiment, for each candidate sCell, the geographic signature for the candidate sCell includes information that is indicative of one or more radial boundaries of the candidate sCell with respect to a serving cell of the wireless device. In one embodiment, the position information of the wireless device includes information that is indicative of a radial position of the wireless device with respect to the serving cell of the wireless device.

Further, in one embodiment, the information that is indicative of the one or more radial boundaries of the candidate sCell with respect to the serving cell of the wireless device includes at least one RSRP threshold, and the information that is indicative of the radial position of the wireless device with respect to the serving cell of the wireless device is a Reference Signal Received Power (RSRP) measurement. In another embodiment, the information that is indicative of the one or more radial boundaries of the candidate sCell with respect to the serving cell of the wireless device includes at least one accumulated timing advance error threshold, and the information that is indicative of the radial position of the wireless device with respect to the serving cell of the wireless device is an accumulated timing advance error between the wireless device and the serving cell of the wireless device.

Further, in one embodiment, the one or more sCells selected for the wireless device are one or more of the candidate sCells for which the radial position of the wireless device with respect to the serving cell of the wireless device is within the one or more radial boundaries characterized by the corresponding geographic signatures.

In one embodiment, for each candidate sCell, the geographic signature for the candidate sCell includes information that is indicative of one or more radial boundaries of the candidate sCell with respect to the serving cell of the wireless device and information that is indicative of angular boundaries of the candidate sCell with respect to a reference angle of the serving cell. Further, in one embodiment, the position information of the wireless device includes information that is indicative of a radial position of the wireless device with respect to the serving cell of the wireless device and information that is indicative of an angular position of the wireless device with respect to the reference angle of the serving cell.

In one embodiment, the information that is indicative of the angular position of the wireless device is one or more of a group consisting of: a precoding matrix index and a beamforming index. Further, in one embodiment, the information that is indicative of the radial boundaries of the candidate sCell with respect to the serving cell of the wireless device includes at least one RSRP threshold that corresponds to at least one of the radial boundaries of the candidate sCell with respect to the serving cell of the wireless device, and the information that is indicative of the radial position of the wireless device with respect to the serving cell of the wireless device comprises an RSRP measurement made by the wireless device for the serving cell of the wireless device. In another embodiment, the information that is indicative of the radial boundaries of the candidate sCell with respect to the serving cell of the wireless device includes at least one accumulated timing advance error threshold that corresponds to at least one of the radial boundaries of the candidate sCell with respect to the serving cell of the wireless device, and the information that is indicative of the radial position of the wireless device with respect to the serving cell of the wireless device comprises an accumulated timing advance error between the wireless device and the serving cell.

In one embodiment, the network node selects the one or more sCells for the wireless device for which the radial position of the wireless device with respect to the serving cell of the wireless device is within the radial boundaries of the one or more of the plurality of candidate sCells and the angular position of the wireless device relative to the reference angle of the serving cell is within the angular boundaries of the one or more of the plurality of candidate sCells.

In another embodiment, the geographic signatures comprise, for each candidate sCell, information that is indicative of angular boundaries of the candidate sCell with respect to a reference angle of the serving cell. Further, in one embodiment, the network node selects the one or more of the candidate sCells for which the angular position of the wireless device relative to the reference angle of the serving cell is within the angular boundaries of the one or more of the plurality of candidate sCells.

In one embodiment, obtaining the geographic signatures for the candidate sCells includes receiving position information with respect to the serving cell of the wireless device from wireless devices located in the coverage area of one of the plurality of candidate sCells, and updating the geographic signature for the one of the plurality of candidate sCells based on the position information received from the wireless devices located in the coverage area of the one of the plurality of candidate sCells. Further, in one embodiment, updating the geographic signature includes updating the geographic signature such that there is at least a predefined confidence level that wireless devices located within a geographic area defined by the geographic signature are within the coverage area of the one of the plurality of candidate sCells.

In one embodiment, the network node is further configured to trigger selecting the one or more sCells for the wireless device in response to expiry of a timer defined for the wireless device. In one embodiment, the timer is a function of one or more of a group consisting of: a proximity of the wireless device to a nearest one of the candidate sCells, a mobility of the wireless device, and a number of unsuccessful new sCell selections for the wireless device since a last successful sCell selection for the wireless device. In another embodiment, the timer is inversely related to a mobility of the wireless device. In another embodiment, the timer is directly related to a number of unsuccessful new sCell selections for the wireless device since a last successful sCell selection for the wireless device.

In one embodiment, the network node is further configured to determine whether selection of the one or more sCells is successful. In one embodiment, determining whether selection of the one or more sCells is successful includes, for each sCell of the one or more sCells selected for the wireless device, determining that selection of the sCell is successful if the sCell does not become worse than a predefined threshold within a predefined amount of time after configuring the sCell.

In one embodiment, the network node is further configured to determine a quality of at least one of the geographic signatures. In another embodiment, the network node is further configured to, for each sCell of at least one of the candidate sCells, determine a quality of the geographic signature for the sCell based on a quality criterion. In one embodiment, the quality criterion is a function of a number of times that the candidate sCell has successfully been selected as an sCell for a wireless device based on the geographic signature for the candidate sCell and a number of attempts to select the candidate sCell as an sCell for a wireless device based on the geographic signature for the candidate sCell.

In one embodiment, network node is a base station that serves the serving cell of the wireless device.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
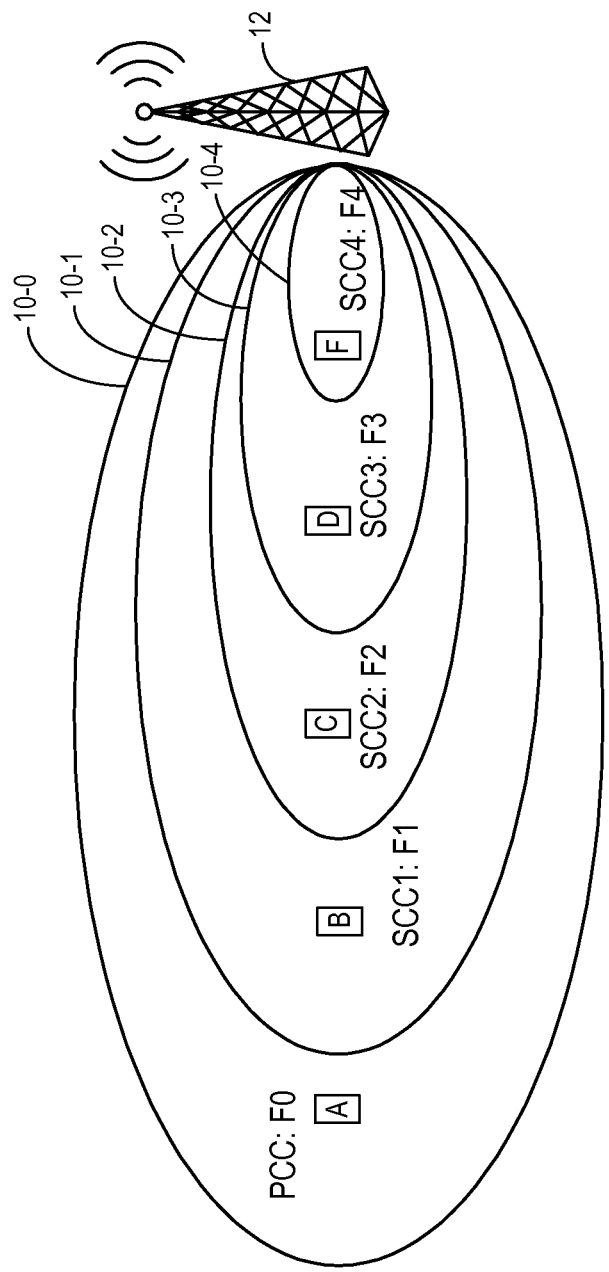
FIG. 1 illustrates one example of carrier aggregation in a cellular communications network.
Figure 2:
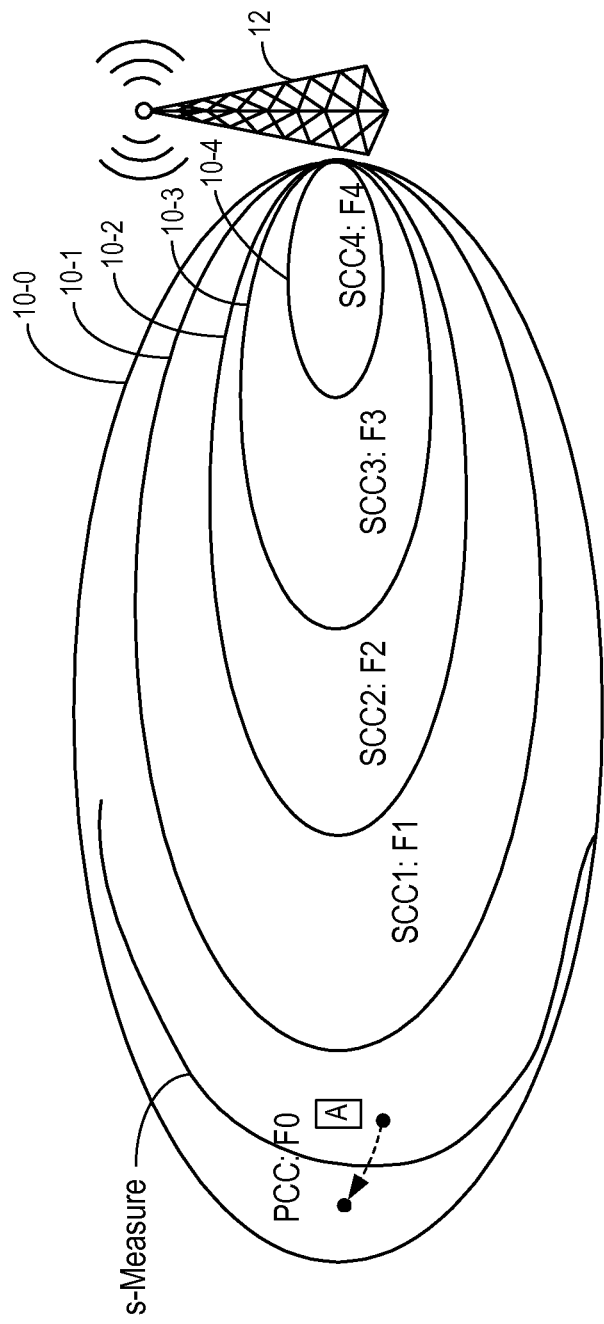
FIG. 2 illustrates an s-Measure parameter with relation to the carrier aggregation example of FIG. 1.
Figure 3:
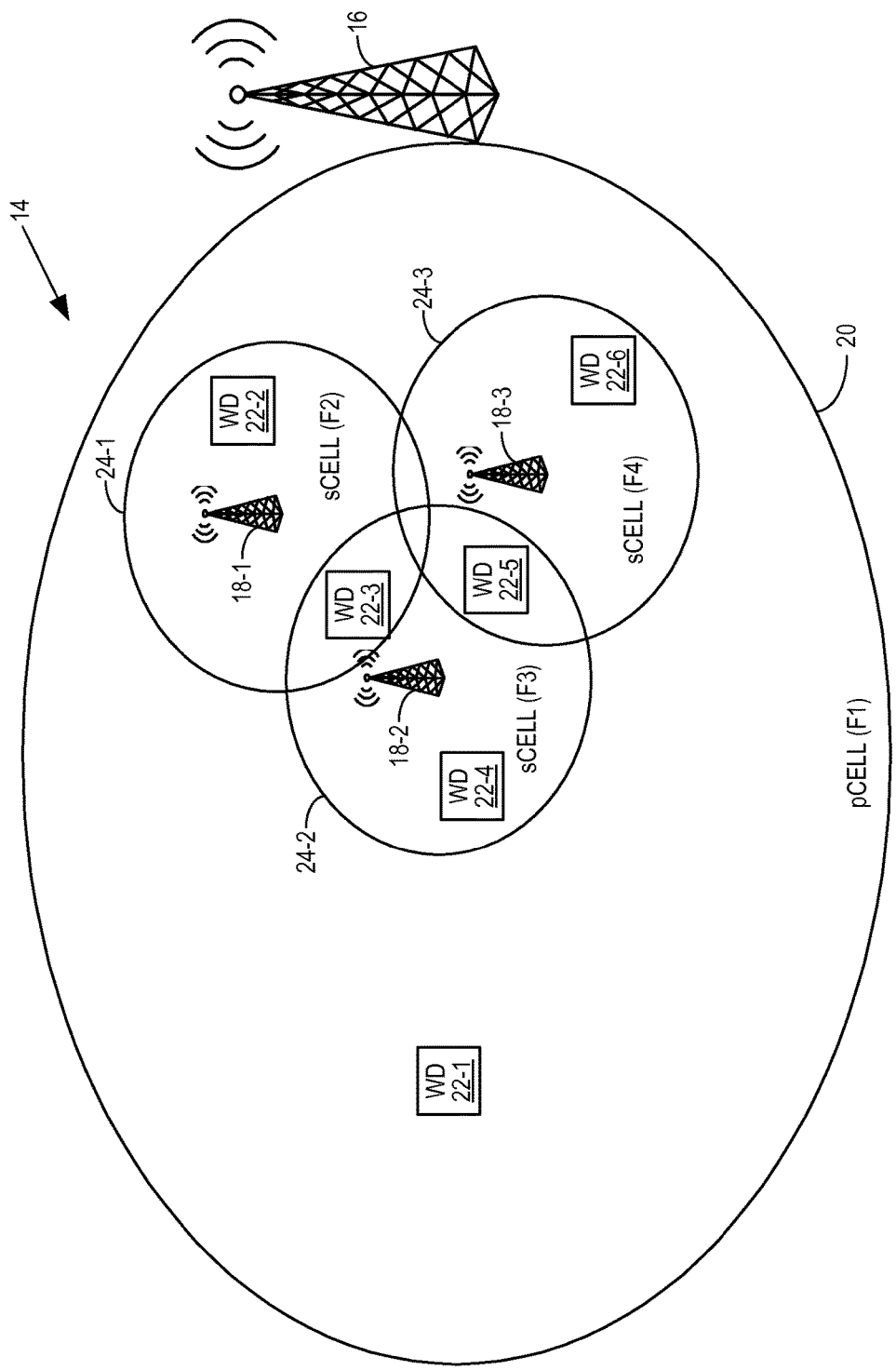
FIG. 3 illustrates a cellular communications network in which a base station performs Secondary Cell (sCell) selection for wireless devices based on geographic signatures that approximate coverage areas of candidate sCells according to one embodiment of the present disclosure.
Figure 5:
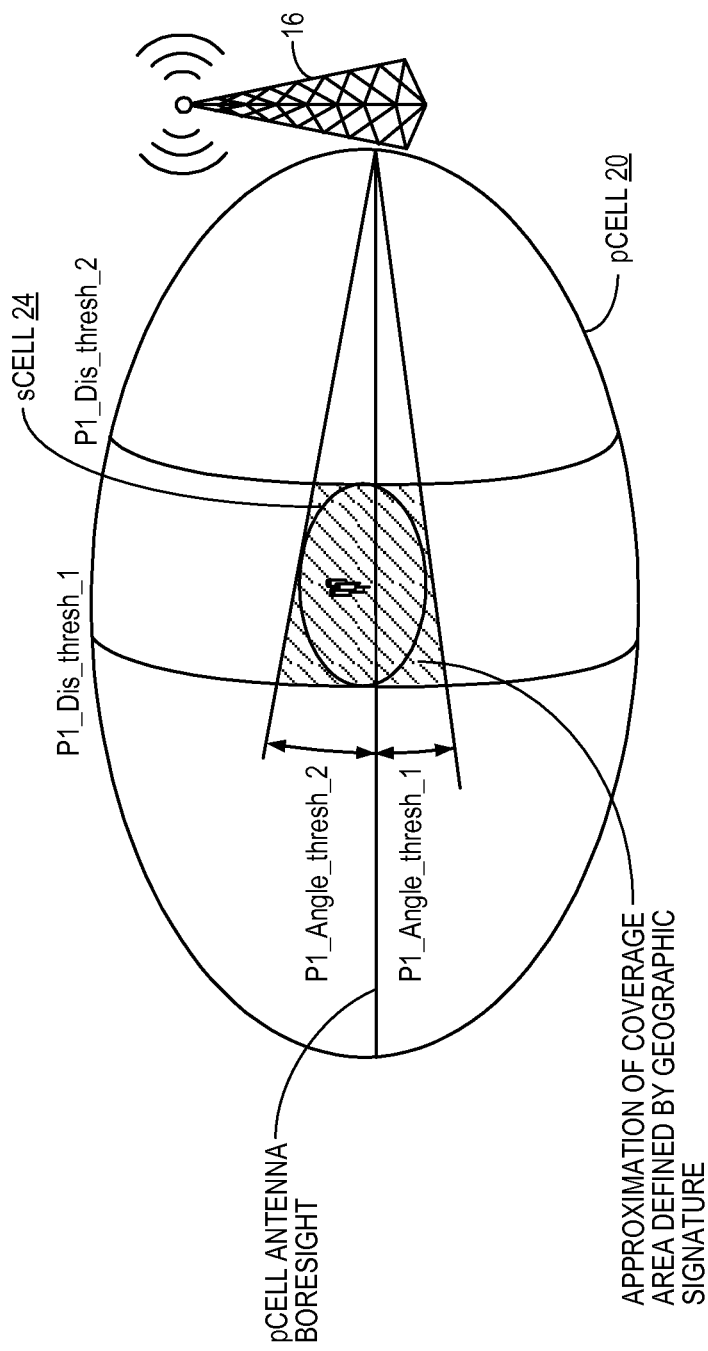
Figure 6:
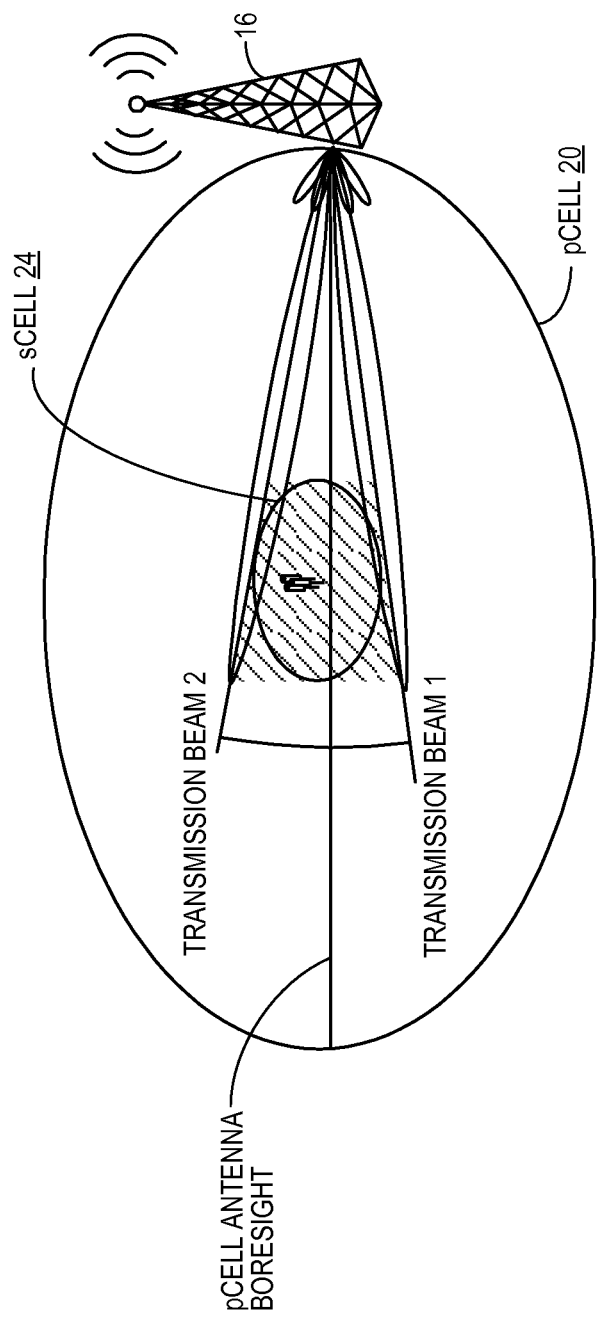
Figure 7:
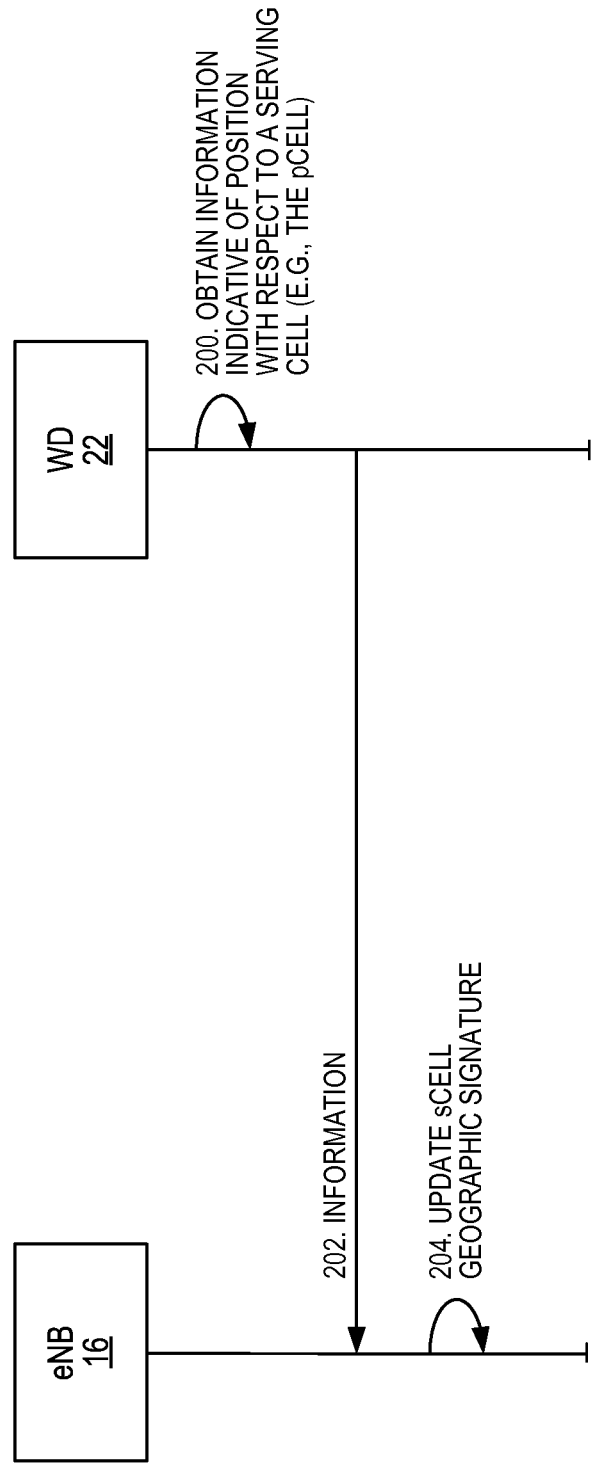
Figure 8A:
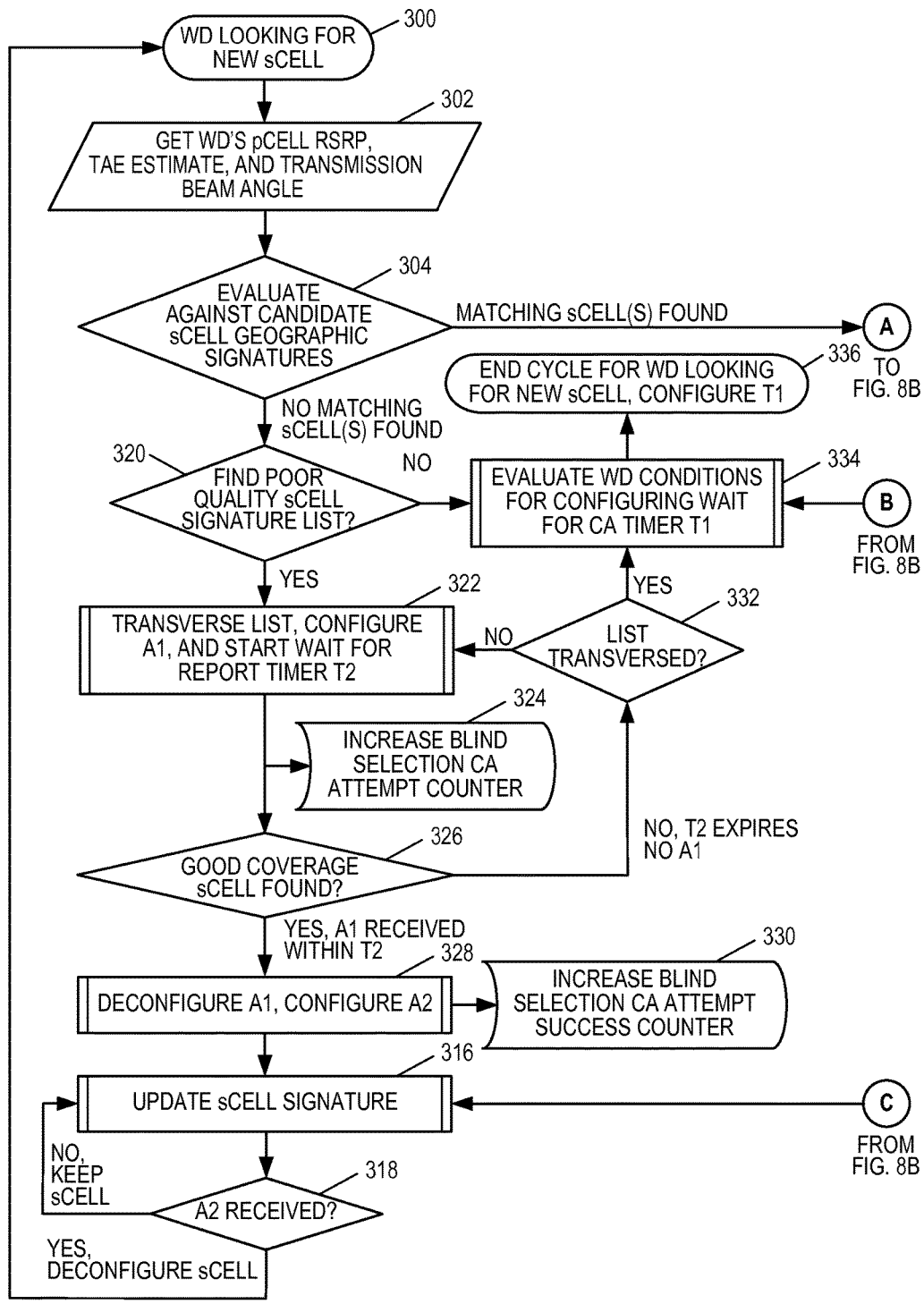
Figure 8B:
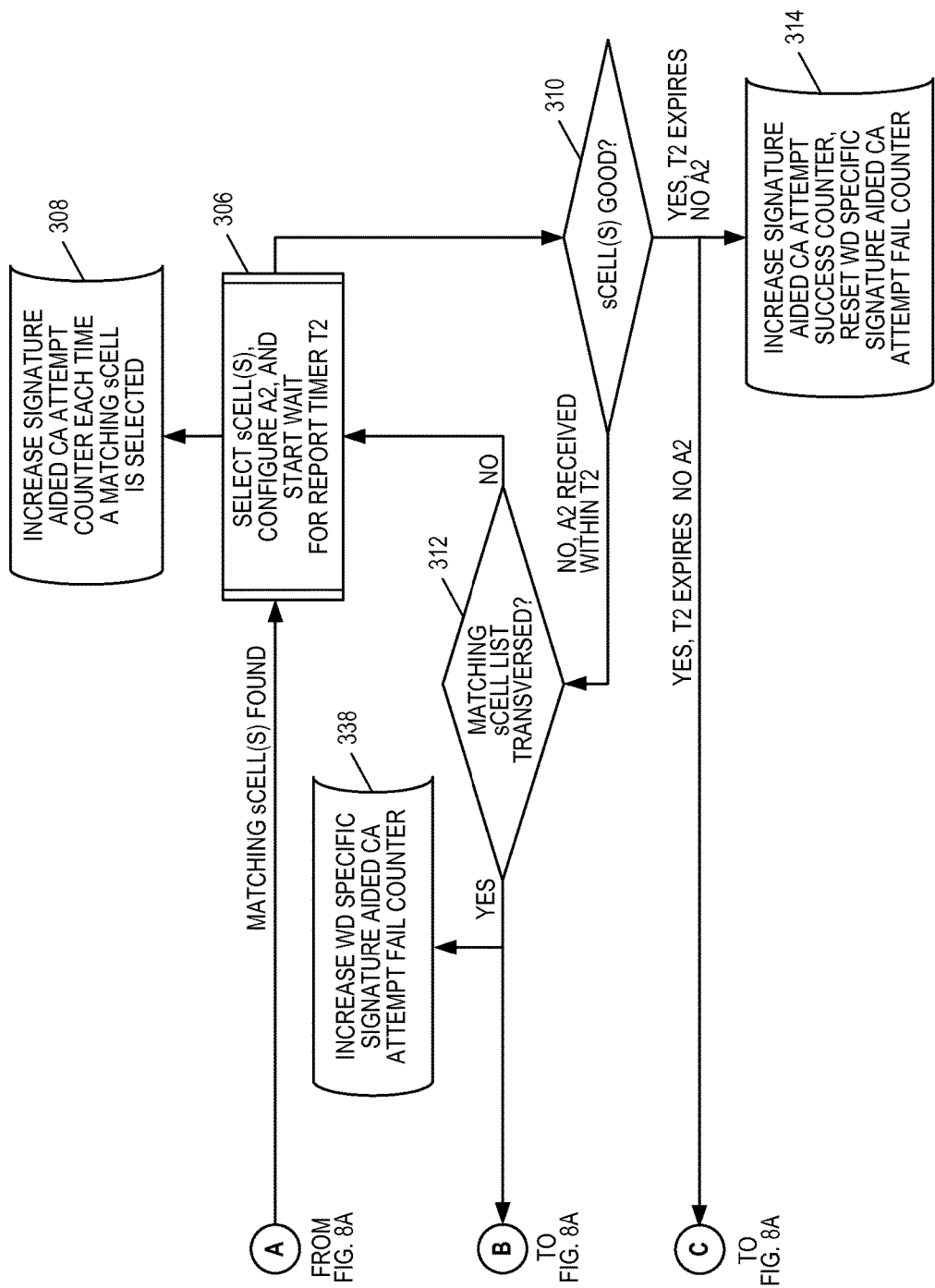
Figure 9:
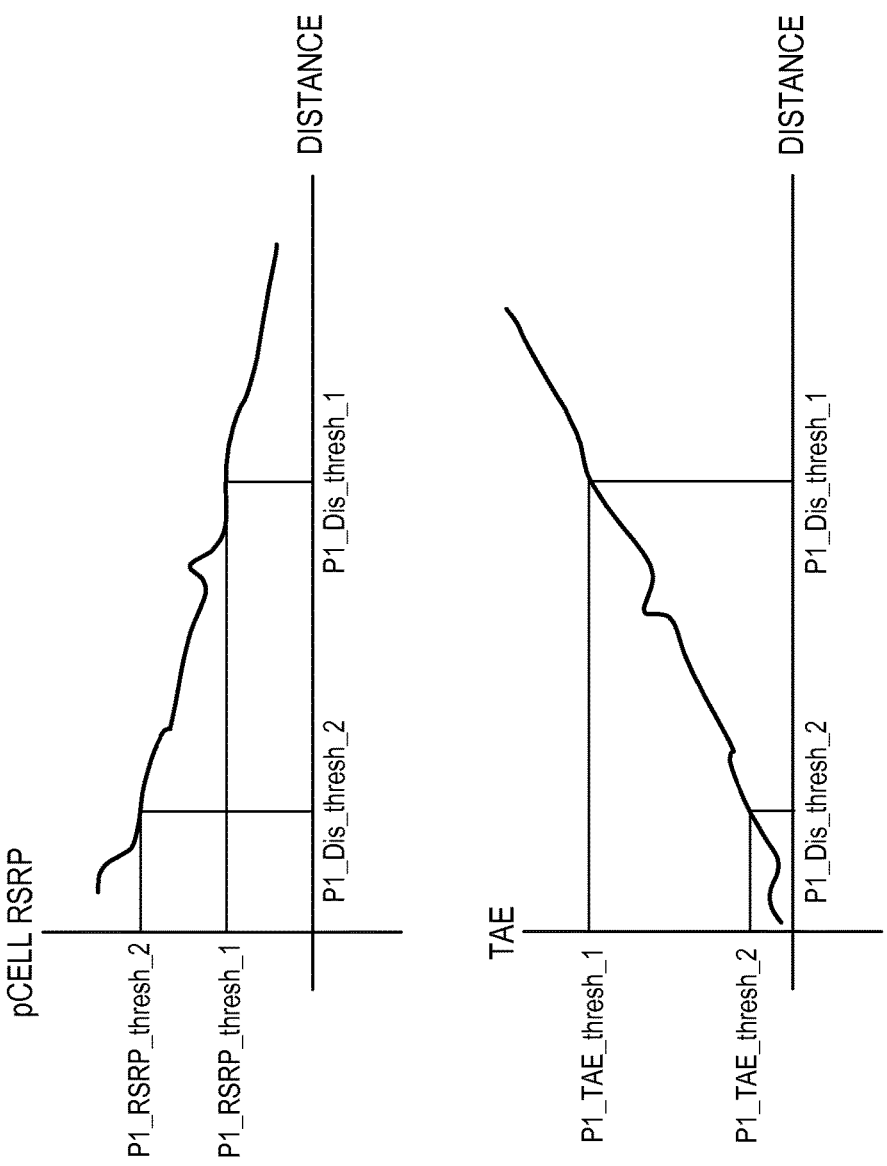
Figure 10:
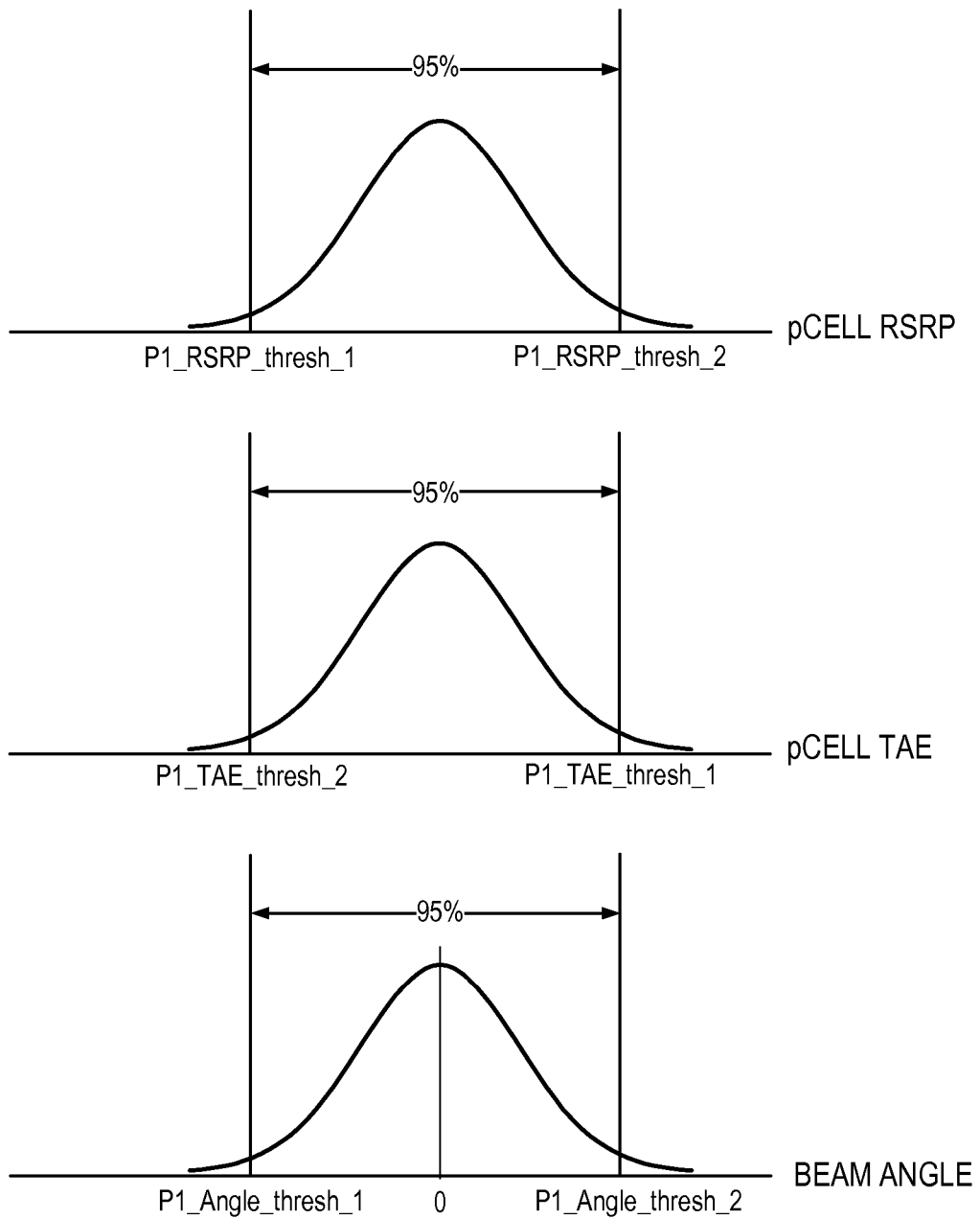
Figure 11:
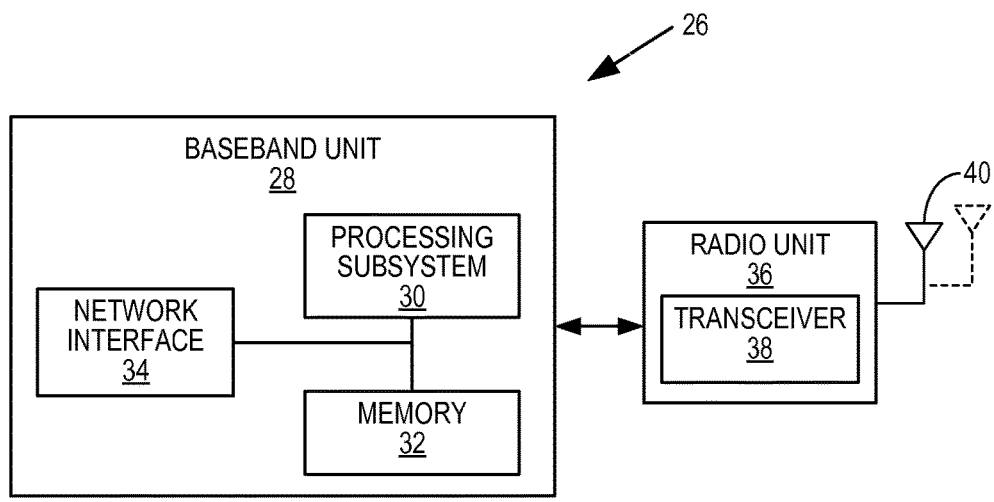
Figure 12:
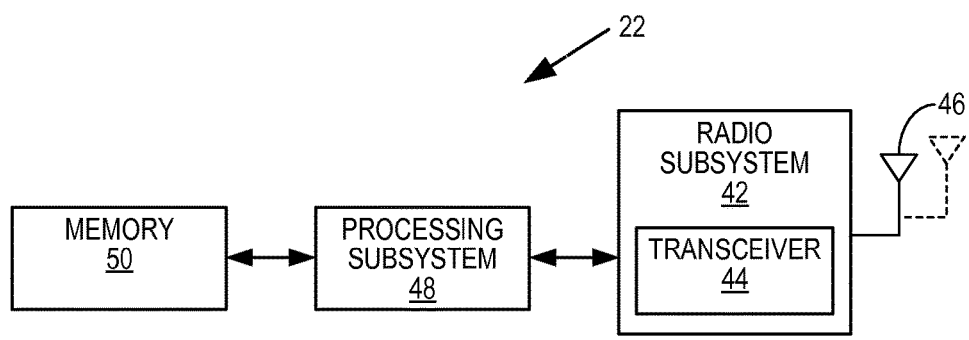

FIG. 5 graphically illustrates a geographic signature for a candidate sCell according to one embodiment of the present disclosure;

FIG. 6 graphically illustrates the use of beamforming indices to define angular thresholds for a geographic signature for a candidate sCell according to one embodiment of the present disclosure;

FIG. 7 illustrates the operation of the base station of FIG. 3 to update a geographic signature for a candidate sCell according to one embodiment of the present disclosure;

FIGS. 8A and 8B depict a flow chart that illustrates the operation of the base station of FIG. 3 to perform sCell selection and update geographic signatures for candidate sCells according to one embodiment of the present disclosure;

FIG. 9 graphically illustrates Reference Signal Received Power (RSRP) thresholds and accumulated Timing Advance Error (TAE) thresholds that either alone or in combination can be used a radial thresholds of a geographic signature for a candidate sCell according to one embodiment of the present disclosure;

FIG. 10 graphically illustrates the selection of radial and angular thresholds for a geographic signature for a candidate sCell according to one embodiment of the present disclosure;

FIG. 11 is a block diagram of a base station according to one embodiment of the present disclosure; and FIG. 12 is a block diagram of a wireless device according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods for secondary cell (sCell) selection for wireless devices operating according to a carrier aggregation scheme in a cellular communications network are disclosed. In this regard, FIG. 3 illustrates a cellular communications network 14 in which sCell selection is performed according to one embodiment of the present disclosure. Note that in many of the embodiments described herein, the cellular communications network 14 is a 3$^{rd}$ Generation Partnership Project (3GPP) Long Term Evolution (LTE) or LTE-Advanced cellular communications network and, as such, LTE or LTE-Advanced terminology is sometimes used. However, the concepts disclosed herein can be applied to any suitable wireless network (e.g., cellular communications network) that utilizes carrier aggregation and in which sCell selection is desired.

As illustrated, the cellular communications network 14 includes a base station 16, which in LTE terminology is referred to an enhanced or evolved Node B (eNB) 16, and a number of Remote Radio Heads (RRHs) 18-1 through 18-3 (generally referred to herein collectively as RRHs 18 and individually as RRH 18). The RRHs 18 are RRHs of the base station 16. In this example, the base station 16 serves a cell that is a serving cell and more particularly a Primary Cell (pCell) 20 for a number of wireless devices 22-1 through 22-6 (generally referred to herein collectively as wireless devices 22 and individually as wireless device 22) located within a coverage area of the pCell 20. As used herein, the coverage area of a cell (e.g., the coverage area of the pCell 20) is a geographic area covered by the pCell 20. Cells of the RRHs 18-1 through 18-3 could also be serving cells and more specifically sCells 24-1 through 24-3 (generally referred to herein collectively as sCells 24 and individually as sCell 24) of the corresponding wireless devices 22 located within coverage areas of the sCells 24 once they are configured. Note that while the macro cell 20 is the pCell in this example, the macro cell 20 may, in another example, be a secondary cell. For instance, using the wireless device 22-2 as an example, the small cell 24-1 may alternatively be the pCell for the wireless device 22-2 and the macro cell 20 may alternatively be an sCell for the wireless device 22-2.

As discussed below in detail, geographic signatures that approximate the coverage areas of the sCells 24-1 through 24-3 (which, in this example, are candidate sCells for the wireless devices 22-1 through 22-6) together with position information that is indicative of the positions of the wireless devices 22-1 through 22-6 are utilized for sCell selection for the wireless devices 22-1 through 22-6. In this particular example, none of the sCells 24-1 through 24-3 are selected as sCells for the wireless device 22-1, the sCell 24-1 is selected as an sCell for the wireless device 22-2, the sCells 24-1 and 24-2 are selected as sCells for the wireless device 22-3, the sCell 24-2 is selected as an sCell for the wireless device 22-4, the sCells 24-2 and 24-3 are selected as sCells for the wireless device 22-5, and the sCell 24-3 is selected as an sCell for the wireless device 22-6. For each wireless device 22, one or more of the selected sCell(s) 24 for the wireless device 22 are configured for the wireless device 22 and can then be utilized together with the pCell 20 for uplink and/or downlink using carrier aggregation.

In some embodiments, the geographic signature for each sCell 24 is defined by one or more radial thresholds with respect to one or more other cells (e.g., the pCell 20) and/or one or more angular thresholds with respect to a reference angle of one or more other cells (e.g., the pCell 20). The one or more radial thresholds may be, for example, a pair of Reference Signal Received Power (RSRP) thresholds for the pCell 20, a pair of Timing Advance Error (TAE) thresholds for the pCell 20, or a combination thereof. The one or more angular thresholds may be, for example, a pair of angular thresholds relative to a reference angle, e.g., a bore sight angle, of the base station 16 for the pCell 20.

Figure 4:
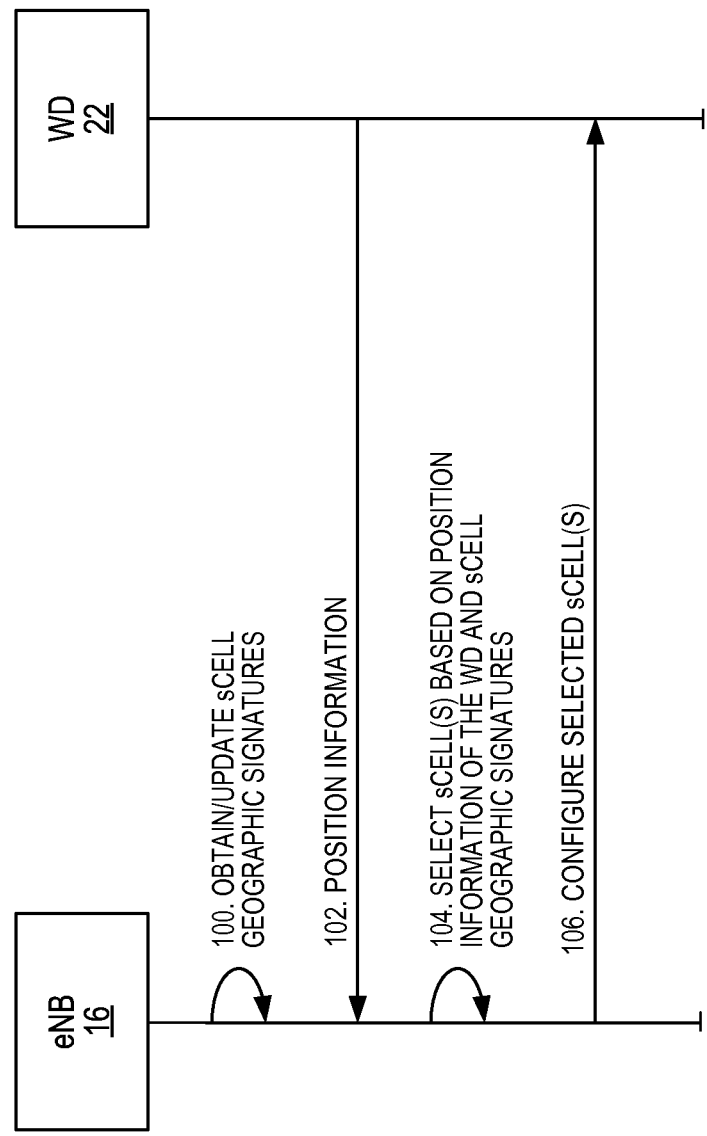
FIG. 4 illustrates the operation of the base station of FIG. 3 to perform sCell selection for a wireless device according to one embodiment of the present disclosure.

FIG. 4 illustrates the operation of the cellular communications network 14 of FIG. 3 according to one embodiment of the present disclosure. Notably, while the base station 16 performs sCell selection in this embodiment, sCell selection may be performed by any suitable network node (i.e., any suitable radio access network node or any suitable core network node, e.g., a mobility management entity). As illustrated, the base station 16 obtains (e.g., updates) the geographic signatures for the sCells 24 (step 100). For each sCell 24, the geographic signature for the sCell 24 is any suitable information that approximates the coverage area of the sCell 24. As discussed below, in one embodiment, the geographic signature for each sCell 24 is defined with respect to the pCell 20. More specifically, in some embodiments, the geographic signature for each sCell 24 is defined by one or more radial thresholds with respect to the pCell 20 (e.g., a pair of RSRP thresholds for the pCell 20) and/or one or more angular thresholds relative to a reference angle of the pCell 20 (e.g., a pair of angular thresholds relative to a reference angle, e.g., a bore sight angle, of the base station 16 for the pCell 20).

Note that while in some embodiments the geographic signatures for the sCells 24 are defined with respect to the pCell 20, the geographic signatures for the sCells 24 may additionally or alternatively be defined with respect to any serving cell or combination of serving cells of the wireless devices 22. Further, using more than one serving cell to characterize the geographic signatures for the sCells 24 may further improve the reliability of the geographic signatures.

In one embodiment, the geographic signatures for the sCells 24 are set based on simulation for initial deployment. In another embodiment, the geographic signatures for the sCells 24 are set based on measurements made using special measurement equipment (e.g., via drive tests). However, in one embodiment described in detail below, the geographic signatures for the sCells 24 are set based on measurements (e.g., RSRP measurements and/or accumulated timing advance errors) made for the wireless devices 22 with respect to serving cell(s) (e.g., the pCell 20) of the wireless devices 22 when the wireless devices 22 are located in the coverage areas of the sCells 24 and/or information (e.g., precoding or beamforming indices) that are indicative of angular positions of the wireless devices 22 with respect to the serving cell(s) (e.g., the pCell 20) when located in the coverage areas of and configured with the sCells 24. The measurements made for the wireless devices 22 may be made by the wireless devices 22 (e.g., RSRP measurements made by the wireless devices 22) and/or made by the base station 16 (e.g., accumulated timing advance error values provided at the base station 16).

The wireless device 22 for which sCell selection is to be performed provides position information to the base station 16 (step 102). The position information is any suitable information that is indicative of the position of the wireless device 22 relative to the approximated coverage areas of the sCells 24 (which at this point are referred to as candidate sCells) defined by the geographic signatures for the sCells 24. Note while the position information is provided to the base station 16 from the wireless device 22 in this example, the position information may additionally or alternatively be obtained locally by the base station 16 (e.g., accumulated timing advance error for the wireless device 22 accumulated at the base station 16). The base station 16 then selects one or more of the candidate sCells as the sCell(s) 24 of the wireless device 22 based on the position information of the wireless device 22 and the geographic signatures for the candidate sCells (step 104). More specifically, for each candidate sCell 24, the base station 16 determines whether the position of the wireless device 22 as defined by the position information is within the coverage area of the candidate sCell 24 as approximated by the geographic signature for the candidate sCell 24. If so, the candidate sCell 24 is selected as an sCell 24 for the wireless device 22. Once sCell selection has been performed, the base station 16 configures the selected sCell(s) 24 for the wireless device 22 (step 106). If the configured sCell is found to have coverage for the wireless device 22, the configured sCell can be activated and used for uplink and/or downlink carrier aggregation.

Notably, in one embodiment, a variable time for triggering sCell selection is configured for each of the wireless devices 22 that are looking for new sCell(s) 24. In one embodiment, this timer is to reduce wasted communication for sCell selection. In other words, the timer is used to control how often sCell selection is performed. Upon expiration of the timer, sCell selection is performed for the corresponding wireless device 22. The timer for each wireless device 22 may be set based on, for example, any one or any combination of the following:

Whether the wireless device 22 is near the coverage area of any of the sCells 24. The timer may be set to a small value if the wireless device 22 is located near the coverage areas of one or more of the sCells 24. Alternatively, the timer may be set to a large value if the wireless device 22 is far from the coverage areas of all of the sCells 24 (e.g., if the position of the wireless device 22 is far from the thresholds defined by the geographic signatures that approximate the coverage areas of all of the sCells 24).

The mobility of the wireless device 22 (e.g., whether the wireless device 22 is moving or not). For example, the timer may be set to a small value if the wireless device 22 is moving and is near the coverage areas of one or more of the sCells 24 or set to a large value if the wireless device 22 is not moving (or is slowly moving) and is far from the coverage areas of all of the sCells 24.

A number of unsuccessful new sCell selections for the wireless device 22 since a last successful sCell selection for the wireless device 22. For example, the timer may be set to zero or some minimum value upon the occurrence of a successful sCell selection for the wireless device 22 and subsequently increased for each unsuccessful sCell selection for the wireless device 22.

Also, in one embodiment, after configuring an sCell 24 for the wireless device 22, another timer may be utilized together with a L3 measurement to determine whether the sCell selection was successful. More specifically, in one embodiment, if an A2 event occurs before this timer expires, then the sCell selection is determined to be unsuccessful. In LTE, the A2 event occurs when a serving cell becomes less than a threshold. In response to the unsuccessful sCell selection, an appropriate action may be taken, e.g., the geographic signature for the sCell 24 may be adjusted in light of the unsuccessful sCell selection.

FIG. 5 graphically illustrates a geographic signature for an sCell 24 according to one embodiment of the present disclosure. In this embodiment, the coverage area of the sCell 24 is defined, or characterized by, two radial thresholds (P1_Dis_thresh_1 and P1_Dis_thresh_2) with respect to the pCell 20 (or macro cell) served by the base station 16 and two angular thresholds (P1_Angle_thresh_1 and P1_Angle_thresh_2) relative to a reference angle of the pCell 20 served by the base station 16, where in this embodiment the reference angle is defined by a boresight of the pCell antenna at the base station 16. The radial thresholds (P1_Dis_thresh_1 and P1_Dis_thresh_2) define inner and outer boundaries of the coverage area of the sCell 24 in a radial direction with respect to the pCell 20 and, in particular, relative to the pCell antenna of the base station 16. Note that, for co-located antennas between the pCell 20 and the sCell 24, P1_dis_threshold_2 is not needed. In one embodiment, the radial thresholds (P1_Dis_thresh_1 and P1_Dis_thresh_2) are RSRP thresholds relative to the base station 16 for the pCell 20, accumulated TAE thresholds relative to the base station 16 for the pCell 20, or a combination thereof. Further, in one embodiment, the radial thresholds (P1_Dis_thresh_1 and P1_Dis_thresh_2) are determined by aggregated RSRP measurements and/or aggregated TAE estimates for all of the wireless devices 22 that are in the coverage area of and configured with the sCell 24 (i.e., are under good coverage of the sCell 24).

The angular thresholds (P1_Angle_thresh_1 and P1_Angle_thresh_2) define boundaries of the coverage area of the sCell 24 in an angular or tangential direction relative to the boresight of the pCell antenna. In one embodiment, the angular thresholds (P1_Angle_thresh_1 and P1_Angle_thresh_2) are angles defined by precoding and/or beamforming indices. Further, in one embodiment, the angular thresholds (P1_Angle_thresh_1 and P1_Angle_thresh_2) are determined by aggregated transmission beam angles (as defined by precoding and/or beamforming indices) of all of the wireless devices 22 that are located in the coverage area of and configured with the sCell 24. For LTE, the angular thresholds (P1_Angle_thresh_1 and P1_Angle_thresh_2) are determined by, in one embodiment, the aggregated transmission beam angles of all of the wireless devices 22 located in the coverage area of the sCell 24 that are in transmission mode 4 (particularly for 4 transmit antennas), 7, 8, or 9. This is graphically illustrated in FIG. 6. Together, the radial thresholds (P1_Dis_thresh_1 and P1_Dis_thresh_2) and the angular thresholds (P1_Angle_thresh_1 and P1_Angle_thresh_2) define the geographic signature for the sCell 24, where the geographic signature provides an approximation of the coverage area of the sCell 24, as illustrated. Note, however, that the geographic signatures are not limited to having both the radial thresholds and the angular thresholds. Rather, the geographic signatures may include radial thresholds, angular thresholds, or both.

Using the geographic signature for the sCell 24 of FIG. 5 as an example, when sCell selection is performed for one of the wireless devices 22, the position information for the wireless device 22 is obtained. The position information defines the position of the wireless device 22 with respect to the pCell 20 and includes a radial position (e.g., RSRP measurement for the pCell 20 and/or an accumulated TAE estimate for the pCell 20) and an angular or tangential position of the wireless device 22 with respect to the pCell 20 (e.g., an angle defined by a precoding matrix index when operating in transmission mode 4 or an angle defined by a beamforming index when operating in transmission mode 7, 8, or 9). If the position of the wireless device 22 is within the coverage area of the sCell 24 as approximated by the geographic signature for the sCell 24, the sCell 24 is selected for the wireless device 22. The sCell 24 is then configured for the wireless device 22. Importantly, the position information of the wireless device 22 does not require measurement gaps and is not subject to s-Measure control. As such, the sCell selection process does not suffer from throughput loss associated with measurement gaps used for traditional sCell selection. Further, the sCell selection process does not require disabling s-Measure and, as such, can benefit from the battery savings provided by s-Measure.

In one embodiment, after the sCell 24 is configured for the wireless device 22, position information of the wireless device 22 while the sCell 24 is configured for the wireless device 22 (i.e., while the wireless device 22 is in the coverage area of the sCell 24) can be used to update the geographic signature for the sCell 24. In this regard, FIG. 7 illustrates the operation of the cellular communications network 14 to update the geographic signature for the sCell 24 according to one embodiment of the present disclosure. As illustrated, while in the coverage area of and configured with the sCell 24, the wireless device 22 obtains position information that is indicative of the position of the wireless device 22 with respect to the pCell 20 (step 200). As discussed above, in one embodiment, the position information includes an RSRP measurement performed by the wireless device 22 for the pCell 20. The position information may also include a precoding and/or beamforming index that is indicative of the angular position of the wireless device 22. The wireless device 22 provides the position information to the base station 16 (step 202). In addition or alternatively, position information for the wireless device 22 may be obtained locally at the base station 16 (e.g., an accumulated TAE estimate for the wireless device 22 for the pCell 20 and/or an uplink signal strength for an uplink of the wireless device 22 for the pCell 20).

The base station 16 then uses the position information to update the geographic signature for the sCell 24 (step 204). In one particular embodiment, while the wireless device 22 is in the coverage area of the sCell 24, A1/A2 measurement events are configured on the sCell 24 to evaluate its coverage. An A1 event is when the serving cell becomes better than a threshold, whereas an A2 event is when the serving cell becomes worse than a threshold. The associated statistics/counters are updated based on triggered A1/A2 measurement events. While the wireless device 22 is under good coverage of the sCell 24, the position information (e.g., radial and angular position) is provided to and collected by the base station 16 and used to update the geographic signature for the sCell 24. Thus, in this manner, the geographic signatures for the sCells 24 can be updated using the position information for the wireless devices 22 served by the pCell 20 and configured with the sCells 24.

FIGS. 8A and 8B illustrate a flow chart that illustrates the operation of a network node (e.g., the base station 16) to perform sCell selection and to update the geographic signatures for the sCells 24 according to one embodiment of the present disclosure. As illustrated, the process begins when one of the wireless devices 22 is looking for new sCell(s) 24 (step 300). This may occur, for example, when the wireless device 22 is newly connected to the pCell 20 without any configured sCells 24, when a handover of the wireless device 22 to the pCell 20 is performed, when the wireless device 22 is no longer in the coverage area(s) of previous sCell(s) 24 configured for the wireless device 22 (e.g., an A2 measurement event is triggered), or when the wireless device 22 (with or without configured sCell(s) 24) is looking for new sCell(s) 24 upon T1 expiration (see step 334 for a definition of T1). Note that the timer T1 is a timer used to reduce RRC messaging associated with configuring and promptly de-configuring sCells that are not really in coverage. The first instance through the process of FIGS. 8A and 8B may, in some embodiments, be made without ever waiting for T1 to be set and expire.

When the wireless device 22 is looking for new sCell(s) 24, the network node gets, or obtains, an RSRP measurement from the wireless device 22 for the pCell 20, an accumulated TAE estimate of the wireless device 22 for the pCell 20, and a transmission beam angle of the wireless device 22 relative to the reference angle of the pCell 20 (step 302). Again, the RSRP measurement and the accumulated TAE estimate directly relate to the radial position of the wireless device 22 within the pCell 20. In general, the radial distance relative to the base station 16 increases within decreasing RSRP and increasing TAE. However, the relationships of RSRP versus distance and TAE versus distance are not monotonic in a real network, e.g., there may be multiple RSRP values with the same distance due to different Radio Frequency (RF) propagation environments and/or different TAE values for different wireless devices 22 that are the same distance from the base station 16 due to multipath effects, etc. The use of both RSRP and TAE may be beneficial to increase the probability of uniquely identifying the distance of the wireless device 22 from the base station 16.

The RSRP measurement of the wireless device 22 for the pCell 20 may already be available if the wireless device 22 has just been handed over to the pCell 20 or if the wireless device 22 is looking for new sCell(s) 24 due to an A2 measurement event trigger. If the RSRP measurement is not available, the network node may configure the wireless device 22 with periodic reporting with a valid period as defined in 3GPP Technical Specification (TS) 36.331 and a report amount of, for example, 1 on the pCell 20.

The accumulated TAE estimate is an absolute TAE estimate. In one embodiment, this includes an initial Random Access Channel (RACH) Timing Advance (TA) estimate and accumulated relative TA estimates based on Physical Uplink Shared Channel (PUSCH) as per procedures 4.2.3 in 3GPP TS 36.213 for LTE Rel-8 and subsequent versions:

TAE(0)=TA_11_bit, TA value based on initial RACH,
TAE(i+1)=TAE(i)+TA_6_bit−31 for i=0, 1, . . . , where TA_b_bit−31 is the relative TA value with respect to the current position,
TAE×16×T is the absolute TA in seconds with respect to initial RACH timing of the wireless device 22.

The transmission beam angle may only apply to certain transmission modes and certain base station antenna configurations (e.g., 4 or 8 closely spaced antennas). For 4 transmit antennas Transmission Mode 4 (TM4), the precoding matrices from table 6.3.4.2.3-2 in 3GPP TS 36.211 V10.7.0 are used based on Precoding Matrix Index (PMI) feedback from the wireless device 22. Each precoding matrix results in a transmission beam of a different angle measured off of the pCell antenna's boresight (as illustrated in FIG. 6). Similarly, each beamforming vector in transmission modes 7, 8, and 9 corresponds to a different transmission beam with a different transmission beam angle.

Next, the network node evaluates the position information of the wireless device 22 against the geographic signatures for the candidate sCells 24 (step 304). As discussed above, the geographic signatures include one or more radial thresholds and angular thresholds. In this embodiment, the radial thresholds are characterized by RSRP and TAE thresholds as illustrated in FIG. 9. In this embodiment, for each candidate sCell 24, the position of the wireless device 22 is located in the coverage area of the candidate sCell 24 as approximated by the geographic signature for the sCell 24 if: (1) the RSRP measurement of the wireless device 22 for the pCell 20 is greater than or equal to P1_RSRP_thresh_1 and less than or equal to P1_RSRP_thresh_2 (see FIG. 9), (2) the accumulated TAE estimate of the wireless device 22 for the pCell 20 is greater than or equal to P1_TAE_thresh_2 and less than or equal to P1_TAE_thresh_1 (see FIG. 9), and (3) the transmission beam angle of the wireless device 22 for the pCell 20 is greater than or equal to P1_Angle_thresh_1 and less than or equal to P1_Angle_thresh_2 (see FIG. 5). Note that (3) only applies if the transmission beam angle is available for the wireless device 22 (e.g., for LTE, the wireless device 22 is in transmission mode 4, 7, 8, or 9). In other words, if the wireless device 22 is in any of the following transmission modes, TM4, Transmission Mode 7 (TM7), Transmission Mode 8 (TM8), Transmission Mode 9 (TM9), the position of the wireless device 22 has to match the geographic signature for the sCell 24 for both radial and tangential conditions for the sCell 24 to be considered a matching sCell. Otherwise, only the radial condition(s) are used. At the end of step 304, a list of matching sCells 24 are found (or no sCells 24 if the wireless device 22 has no sCell coverage).

If there are one or more matching sCells 24, the network node selects and configures a desired number of the matching sCells 24 for the wireless device 22 for carrier aggregation (step 306). If there are more matching sCells 24 than the desired number of sCells 24 to be selected and configured, the network node selects the desired number of sCells 24 from the matching sCells 24 using any suitable criterion (e.g., quality and/or load balancing). For example, if the RSRP measurement for the wireless device 22 falls in the middle of the RSRP thresholds for a first sCell 24 but falls closer to one of the two RSRP thresholds for a second sCell 24, the first sCell 24 may be selected and configured for the wireless device 22 (i.e., the second sCell 24 is considered the better of the two sCells 24). In this embodiment, in step 306, the A2 measurement event is configured to a desired A2 threshold and a desired waitForReportTimer T2 to the selected sCell(s) 24.

For each selected and configured sCell 24, the network node increases a cell wide counter signature_aided_scell_sel_attempt (step 308). The network node also determines whether the selected sCell(s) 24 are good (i.e., if the wireless device 22 is actually in the coverage area of the selected sCell(s) 24) (step 310). In this embodiment, for each selected and configured sCell 24, the sCell 24 is considered good if no A2 measurement event is triggered before the timer T2 has expired, where the timer T2 is started upon selection and configuration of the sCell 24 for the wireless device 22. If an A2 measurement event is triggered before the timer T2 has expired, the wireless device 22 is considered to be outside the coverage area of the sCell 24.

If any of the selected sCells 24 are not good, the network node determines whether all matching sCells 24 identified in step 304 have been processed (i.e., determines whether there are remaining matching sCell(s) 24 that were not selected and configured for the wireless device 22 in step 306) (step 312). If all matching sCells 34 have not been processed, the process returns to step 306 and new sCell(s) 24 are selected and configured to replace the bad sCell(s) 24 identified in step 310. If all matching sCell(s) 24 have been processed, the network node increases the wireless device 22 specific counter signature_aided_scell_sel_fail_wd for the wireless device 22 and the process proceeds to step 334, which is discussed below.

Returning to step 310, if the selected and configured sCell(s) 24 are good, the network node increases a cell wide counter signature_aided_scell_sel_success and resets the wireless device 22 specific counter signature_aided_scell_sel_fail_wd for the wireless device 22 to zero (step 314). In addition, the network node updates the geographic signature(s) for the selected and configured sCell(s) 24 (step 316). More specifically, for each of the sCells 24, the network node collects pCell 20 RSRP measurements, TAE estimates, and transmission beam angle (if applicable) for all wireless devices 22 configured with the sCell 24. The RSRP measurements can be obtained by, for example, configuring periodic reporting on the pCell 20 with an appropriate reporting period (e.g., one minute). The TAE estimates/ measurements are always available as the connected wireless devices 22 are required to keep timing alignment. The transmission beam angles can be calculated based on the beam indices for all wireless devices 22 that are configured with the sCell 24 and use TM4, TM7, TM8, or TM9.

The collected measurements for the sCell 24 are expected to have distributions as illustrated in FIG. 10. With the distributions, the respective thresholds for the geographic signature for the sCell 24 can be determined by taking an average value of each measurement collection and a confidence level. A confidence level of 100% means that all samples in the collection are within the interval defined by the thresholds. A confidence level of 95% means that 95% of samples fall into the region defined by the respective thresholds. It is apparent that tighter thresholds (small confidence interval) will result in a high success rate for selecting the correct sCell 24 as measured by: signature_aided_scell_sel_success/signature_aided_scell_sel_attempt. However, tighter thresholds will leave out wireless devices 22 that might be within the coverage area of the sCell 24. The quality of the geographic signature for the sCell 24 should thus be close to the 100% confidence interval and have a high sCell selection success rate. For example, a geographic signature may be considered good if its confidence interval is above 98% and the success rate is above 90%. Again, the geographic signature for the sCell 24 is not restricted to pCell 20 measurements mentioned above. The geographic signature can include any serving sCell's measurements for carrier aggregation between more than two Component Carriers (CCs). Having measurements for more than one serving cell will enhance the success rate measured by: signature_aided_scell_sel_success/signature_aided_scell_sel_attempt.

Returning to FIG. 8, as discussed above, the A2 measurement event is configured for the wireless device 22 for each of the selected and configured sCell(s) 24. The network node determines whether an A2 measurement event trigger has been received for any of the selected and configured sCell(s) 24 (step 318). If so, the sCell(s) 24 for which the A2 measurement event trigger was received are deconfigured and the process returns to step 300 and is repeated to select a new sCell(s) 24. If an A2 measurement event trigger has not been received, the network node continues to update the geographic signatures for the sCells 24.

Returning to step 304, if there are no matching sCells 24, the network node checks the quality of the geographic signatures for the candidate sCells 24 with the criteria described above with respect to step 316 (step 320). If the quality of the geographic signatures for all of the candidate sCells 24 are good (i.e., better than predefined threshold(s)), then the process proceeds to step 334, which is described below. If the quality of the geographic signatures for one or more of the candidate sCells 24 is poor, then the network node transverses a resulting list of candidate sCells 24 having geographic signatures with poor quality to rank those candidate sCells 24 in terms of the proximity of the wireless device 22 to their coverage areas (as approximated by their geographic signatures) (step 322). The closest candidate sCell 24 is ranked first, the next closest candidate sCell 24 is ranked second, and so on. For the first iteration of step 322, the network node selects the first ranked candidate sCell 24, configures the first ranked candidate sCell 24 as an sCell, and configures the A1 measurement event, threshold A1_thresh, and waitForReportTimer T2. The network node then increases a counter blind_scell_sel_attempt (step 324) and determines whether there is good coverage for the selected candidate sCell 24 (step 326). There is good coverage if the A1 measurement event is received within the timer T2. If good coverage is found for the selected sCell 24, the network node deconfigures the A1 measurement event for the sCell 24 and configures the A2 measurement event for the sCell 24 (step 328). In this manner, the selected sCell 24 is configured for the wireless device 22. From that point, the network node increases a blind selection carrier aggregation attempt success counter blind_scell_sel_success (step 330) and also proceeds to step 316 to update the geographic signature for the selected sCell 24.

Returning to step 326, if good coverage is not found for the selected sCell 24, the network node determines whether the ranked list of candidate sCells 24 having geographic signatures of poor quality has been traversed (step 332). If not, the process returns to step 322 and is repeated for the next candidate sCell 24 in the ranked list. If the ranked list has been traversed, the network node evaluates wireless device conditions for configuring the timer T1 (step 334). If no matching sCells 24 were found for the wireless device 22 and none of the sCells 24 have poor quality geographic signatures (i.e., the process arrives at step 334 from step 320), the network node determines that the timer T1 is to be configured to a large value (T1_high). If no matching sCells 24 were found for the wireless device 22 but there are one or more sCells 24 with poor quality geographic signatures (i.e., the process arrives at step 334 from step 332), the network node determines that the timer T1 is to be configured with a smaller timer value (T1_low). If there were matching sCells 24 but one or more of the matching sCells 24 to not have good coverage for the wireless device 22 and there are no remaining matching sCells 24 to be processed (i.e., the process arrives at step 334 from step 312), then the network node determines that the timer T1 is to be configured with a value that is a function of the counter signature_aided_scell_sel_fail_wd. For example, in one embodiment, in this case, the timer T1 is configured to T1_low+signature_aided_scell_sel_fail_wd*delta, where delta is a predefined value such as, for example, five seconds. Thus, as the counter signature_aided_scell_sel_fail_wd increases, the timer T1 will also increase. The network node then configures the timer T1 with the value determined in step 334 and ends the process for sCell selection for the wireless device 22 (step 336).

Note that the process of FIGS. 8A and 8B is just one example. The ordering of the steps may vary and the particular steps performed may vary depending on the particular implementation. Further, while the process of FIGS. 8A and 8B uses RSRP, TAE, and transmission beam angle to characterize the geographic signatures for the sCells 24 and as the position information for the wireless device 22, other types of information may be used (e.g., the location information described in 3GPP TS 36.355 V10.11.0 which is incorporated herein by reference for its teaching on position information).

FIG. 11 is a block diagram of a radio access node 26, e.g., the base station 16) according to one embodiment of the present disclosure. As illustrated, the radio access node 26 includes a baseband unit 28 including a processing subsystem 30, memory 32, and a network interface 34, and a radio unit 36 including a transceiver 38 connected to one or more antennas 40. The transceiver 38 generally includes analog and, in some embodiments, digital components for wirelessly sending and receiving data to and from the wireless devices 22. From a wireless communications protocol view, the transceiver 38 implements at least part of Layer 1 (i.e., the Physical or "PHY" Layer).

The processing subsystem 30 generally implements any remaining portion of Layer 1 not implemented in the transceiver 38 as well as functions for higher layers in the wireless communications protocol (e.g., Layer 2 (data link layer), Layer 3 (network layer), etc.). In particular embodiments, the processing subsystem 30 may comprise, for example, one or several general-purpose or special-purpose microprocessors or other microcontrollers programmed with suitable software and/or firmware to carry out some or all of the functionality of the base station 16 described herein. In addition or alternatively, the processing subsystem 30 may comprise various digital hardware blocks (e.g., one or more Application Specific Integrated Circuits (ASICs), one or more off-the-shelf digital and analog hardware components, or a combination thereof) configured to carry out some or all of the functionality of the base station 16 described herein. Additionally, in particular embodiments, the above described functionality of the radio access node 26 may be implemented, in whole or in part, by the processing subsystem 30 executing software or other instructions stored on a non-transitory computer-readable medium such as, for example, the memory 32 or any other suitable type of data storage component(s).

FIG. 12 is a block diagram of one of the wireless devices 22 according to one embodiment of the present disclosure. As illustrated, the wireless device 22 includes a radio subsystem 42 including a transceiver 44 connected to one or more antennas 46, a processing subsystem 48, and memory 50. The transceiver 44 generally includes analog and, in some embodiments, digital components for wirelessly sending and receiving data to and from the base station 16 and the RRHs 18. From a wireless communications protocol view, the transceiver 44 implements at least part of Layer 1 (i.e., the Physical or "PHY" Layer).

The processing subsystem 48 generally implements any remaining portion of Layer 1 not implemented in the radio subsystem 42 as well as functions for higher layers in the wireless communications protocol (e.g., Layer 2 (data link layer), Layer 3 (network layer), etc.). In particular embodiments, the processing subsystem 48 may comprise, for example, one or several general-purpose or special-purpose microprocessors or other microcontrollers programmed with suitable software and/or firmware to carry out some or all of the functionality of the wireless device 22 described herein. In addition or alternatively, the processing subsystem 48 may comprise various digital hardware blocks (e.g., one or more ASICs, one or more off-the-shelf digital and analog hardware components, or a combination thereof) configured to carry out some or all of the functionality of the wireless device 22 described herein. Additionally, in particular embodiments, the above described functionality of the wireless device 22 may be implemented, in whole or in part, by the processing subsystem 48 executing software or other instructions stored on a non-transitory computer-readable medium, such as the memory 50 or any other suitable type of data storage component(s).

While the embodiments described herein provide numerous advantages, in some example implementations, at least some of the embodiments provide the advantage of using indicators, or information, that is available as a byproduct of activities that the base station 16 already performs, or are at least derived without incurring additional uplink signaling from the wireless devices 22. Note, however, that this advantage is just an example and is not intended to limit the scope of the embodiments disclosed herein.

The following acronyms are used throughout this disclosure.

3GPP 3$^{rd}$ Generation Partnership Project
ASIC Application Specific Integrated Circuit
CC Component Carrier
eNB Enhanced, or Evolved Node B
LTE Long Term Evolution
LTE Rel-8 Long Term Evolution Release 8
LTE Rel-10 Long Term Evolution Release 10
MHz Megahertz
PCC Primary Component Carrier
pCell Primary Cell
PMI Precoding Matrix Index
PUSCH Physical Uplink Shared Channel
RACH Random Access Channel
RF Radio Frequency
RRC Radio Resource Control
RRH Remote Radio Head
RSRP Reference Signal Received Power
SCC Secondary Component Carrier
sCell Secondary Cell
TA Timing Advance
TAE Timing Advance Error
TM4 Transmission Mode 4
TM7 Transmission Mode 7
TM8 Transmission Mode 8
TM9 Transmission Mode 9
TS Technical Specification Those skilled in the art will recognize improvements and modifications to the preferred embodiments of the present disclosure. All such improvements and modifications are considered within the scope of the concepts disclosed herein and the claims that follow.

What is claimed is:

1. A method of operation of a network node in a cellular communications network, the method comprising:
   obtaining geographic signatures for a plurality of candidate secondary cells, the geographic signatures comprising a geographic signature for each candidate secondary cell of the plurality of candidate secondary cells that approximates a coverage area of the candidate secondary cell;
   obtaining position information for a wireless device;
   selecting from the plurality of candidate secondary cells, one or more candidate secondary cells for the wireless device, wherein the selection of the one or more candidate secondary cells is based on the geographic signatures for the plurality of candidate secondary cells and the position information for the wireless device, and wherein the selection of the one or more candidate secondary cells is performed without the position information consisting of measurement gaps and disabling a parameter that controls when the wireless device is required to perform neighbor cell measurements;
   configuring the one or more candidate secondary cells for use by the wireless device according to a carrier aggregation scheme; and
   updating the geographic signatures for the configured one or more candidate secondary cells while the wireless device is within a coverage area of the configured one or more candidate secondary cells, wherein the geographic signatures for the configured one or more candidate secondary cells are updated using the position information of the wireless device,
   wherein the selection of the one or more candidate secondary cells for the wireless device is triggered in response to expiry of a timer defined for the wireless device, and wherein the timer is directly related to a number of unsuccessful new secondary cell selections for the wireless device since a last successful secondary cell selection for the wireless device.

2. The method of claim 1, wherein for each candidate secondary cell of the plurality of candidate secondary cells, the geographic signature for the candidate secondary cell comprises information that is indicative of radial boundaries of the candidate secondary cell with respect to a serving cell of the wireless device.

3. The method of claim 2, wherein the serving cell of the wireless device is a primary cell of the wireless device for the carrier aggregation scheme.

4. The method of claim 2, wherein obtaining the position information for the wireless device comprises obtaining information that is indicative of a radial position of the wireless device with respect to the serving cell of the wireless device.

5. The method of claim 4, wherein:
the information, that is indicative of the radial boundaries of the candidate secondary cell with respect to the serving cell of the wireless device, comprises at least one Reference Signal Received Power, RSRP, threshold that corresponds to at least one of the radial boundaries of the candidate secondary cell with respect to the serving cell of the wireless device; and
the information, that is indicative of the radial position of the wireless device with respect to the serving cell of the wireless device, comprises an RSRP measurement made by the wireless device for the serving cell of the wireless device.

6. The method of claim 4, wherein:
the information, that is indicative of the radial boundaries of the candidate secondary cell with respect to the serving cell of the wireless device, comprises at least one timing advance error threshold that corresponds to at least one of the radial boundaries of the candidate secondary cell with respect to the serving cell of the wireless device; and
the information, that is indicative of the radial position of the wireless device with respect to the serving cell of the wireless device, comprises an accumulated timing advance error between the wireless device and the serving cell of the wireless device.

7. The method of claim 4, wherein:
the information, that is indicative of the radial boundaries of the candidate secondary cell with respect to the serving cell of the wireless device, comprises at least one uplink signal strength threshold that correspond to at least one of the radial boundaries of the candidate secondary cell with respect to the serving cell of the wireless device; and
the information, that is indicative of the radial position of the wireless device with respect to the serving cell of the wireless device, comprises an uplink signal strength measurement between the wireless device and the serving cell of the wireless device.

8. The method of claim 4, wherein selecting the one or more candidate secondary cells for the wireless device comprises selecting one or more of the plurality of candidate secondary cells for which the radial position of the wireless device with respect to the serving cell of the wireless device is within the radial boundaries of the one or more of the plurality of candidate secondary cells.

9. The method of claim 1, wherein the geographic signatures comprise, for each candidate secondary cell of the plurality of candidate secondary cells:
information that is indicative of radial boundaries of the candidate secondary cell with respect to a serving cell of the wireless device; and
information that is indicative of angular boundaries of the candidate secondary cell with respect to a reference angle of the serving cell.

10. The method of claim 9, wherein the serving cell of the wireless device is a primary cell of the wireless device for the carrier aggregation scheme.

11. The method of claim 9, wherein obtaining the position information for the wireless device comprises:
obtaining information that is indicative of a radial position of the wireless device with respect to the serving cell of the wireless device; and
obtaining information that is indicative of an angular position of the wireless device relative to the reference angle of the serving cell.

12. The method of claim 11, wherein the information that is indicative of the angular position of the wireless device is one or more of a group consisting of: a precoding matrix index and a beamforming index.

13. The method of claim 12, wherein:
the information, that is indicative of the radial boundaries of the candidate secondary cell with respect to the serving cell of the wireless device, comprises at least one Reference Signal Received Power, RSRP, threshold that corresponds to at least one of the radial boundaries of the candidate secondary cell with respect to the serving cell of the wireless device; and
the information, that is indicative of the radial position of the wireless device with respect to the serving cell of the wireless device, comprises an RSRP measurement made by the wireless device for the serving cell of the wireless device.

14. The method of claim 12, wherein:
the information, that is indicative of the radial boundaries of the candidate secondary cell with respect to the serving cell of the wireless device, comprises at least one timing advance error threshold that corresponds to at least one of the radial boundaries of the candidate secondary cell with respect to the serving cell of the wireless device; and
the information, that is indicative of the radial position of the wireless device with respect to the serving cell of the wireless device, comprises a time alignment error between the wireless device and the serving cell.

15. The method of claim 11, wherein selecting the one or more candidate secondary cells for the wireless device comprises selecting one or more of the plurality of candidate secondary cells for which the radial position of the wireless device with respect to the serving cell of the wireless device is within the radial boundaries of the one or more of the plurality of candidate secondary cells and the angular position of the wireless device relative to the reference angle of the serving cell is within the angular boundaries of the one or more of the plurality of candidate secondary cells.

16. The method of claim 1, wherein the geographic signatures comprise, for each candidate secondary cell of the plurality of candidate secondary cells, information that is indicative of angular boundaries of the candidate secondary cell with respect to a reference angle of a serving cell of the wireless device.

17. The method of claim 16, wherein the serving cell of the wireless device is a primary cell of the wireless device for the carrier aggregation scheme.

18. The method of claim 16, wherein obtaining the position information for the wireless device comprises obtaining information that is indicative of an angular position of the wireless device relative to the reference angle of the serving cell.

19. The method of claim 18, wherein the information that is indicative of the angular position of the wireless device is one of a group consisting of: a precoding matrix index and a beamforming index.

20. The method of claim 18, wherein selecting the one or more candidate secondary cells for the wireless device comprises selecting one or more of the plurality of candidate secondary cells for which the angular position of the wireless device relative to the reference angle of the serving cell is within the angular boundaries of the one or more of the plurality of candidate secondary cells.

21. The method of claim 1, wherein obtaining the geographic signatures for the plurality of candidate secondary cells comprises:
  obtaining the position information with respect to a serving cell of the wireless device for wireless devices located in the coverage area of one of the plurality of candidate secondary cells; and
  updating the geographic signature for the one of the plurality of candidate secondary cells based on the position information received from the wireless devices located in the coverage area of the one of the plurality of candidate secondary cells.

22. The method of claim 21, wherein updating the geographic signature comprises updating the geographic signature such that there is at least a predefined confidence level that wireless devices located within a geographic area defined by the geographic signature are within the coverage area of the one of the plurality of candidate secondary cells.

23. The method of claim 1, wherein the timer is a function of one or more of a group consisting of: a proximity of the wireless device to a nearest one of the plurality of candidate secondary cells, a mobility of the wireless device, and a number of unsuccessful new secondary cell selections for the wireless device since a last successful secondary cell selection for the wireless device.

24. The method of claim 1, wherein the timer is inversely related to a mobility of the wireless device.

25. The method of claim 1, further comprising determining whether the selection of the one or more candidate secondary cells is successful.

26. The method of claim 25, wherein determining whether the selection of the one or more candidate secondary cells is successful comprises, for each candidate secondary cell of the one or more candidate secondary cells selected for the wireless device, determining that the selection of the candidate secondary cell is successful if the candidate secondary cell does not become worse than a predefined threshold within a predefined amount of time after configuring the candidate secondary cell.

27. The method of claim 1, further comprising determining a quality of at least one of the geographic signatures.

28. The method of claim 1, further comprising, for each candidate secondary cell of at least one of the plurality of candidate secondary cells, determining a quality of the geographic signature for the candidate secondary cell based on a quality criterion.

29. The method of claim 28, wherein the quality criterion is a function of a number of times that the candidate secondary cell has successfully been selected as a secondary cell for the wireless device based on the geographic signature for the candidate secondary cell and a number of attempts to select the candidate secondary cell as a secondary cell for the wireless device based on the geographic signature for the candidate secondary cell.

30. The method of claim 1, wherein the network node is a base station of the wireless device.

31. A base station in a cellular communications network, the base station comprising:
  a transceiver; and
  a processing subsystem associated with the transceiver and configured to:
    obtain geographic signatures for a plurality of candidate secondary cells, the geographic signatures comprising a geographic signature for each candidate secondary cell of the plurality of candidate secondary cells that approximates a coverage area of the candidate secondary cell;
    obtain position information for a wireless device;
    select from the plurality of candidate secondary cells, one or more candidate secondary cells for the wireless device, wherein the selection of one or more candidate secondary cells is based on the geographic signatures for the plurality of candidate secondary cells and the position information for the wireless device, and wherein the selection of one or more candidate secondary cells is performed without the position information consisting of measurement gaps and disabling a parameter that controls when the wireless device is required to perform neighbor cell measurements;
    configure the one or more candidate secondary cells for use by the wireless device according to the carrier aggregation scheme; and
    update the geographic signatures for the configured one or more candidate secondary cells while the wireless device is within a coverage area of the configured one or more candidate secondary cells, wherein the processing subsystem is configured to update the geographic signatures for the configured one or more candidate secondary cells using the position information of the wireless device,
    wherein the selection of the one or more candidate secondary cells for the wireless device is triggered in response to expiry of a timer defined for the wireless device, and wherein the timer is directly related to a number of unsuccessful new secondary cell selections for the wireless device since a last successful secondary cell selection for the wireless device.

* * * * *